E. B. HIATT.
COMBINED LEVELING AND SELF COMPUTING CROSS SECTION ROD.
APPLICATION FILED DEC. 20, 1917.

1,295,749.

Patented Feb. 25, 1919.

Witness
G. H. Buchanan

Inventor
Ernest B. Hiatt
By Oury & Pair ATTYS

UNITED STATES PATENT OFFICE.

ERNEST B. HIATT, OF WINTERSET, IOWA.

COMBINED LEVELING AND SELF-COMPUTING CROSS-SECTION ROD.

1,295,749.
Specification of Letters Patent.
Patented Feb. 25, 1919.

Application filed December 20, 1917. Serial No. 208,007.

*To all whom it may concern:*

Be it known that I, ERNEST B. HIATT, a citizen of the United States, and resident of Winterset, in the county of Madison and State of Iowa, have invented a certain new and useful Combined Leveling and Self-Computing Cross-Section Rod, of which the following is a specification.

The object of my invention is to provide a combined leveling and self-computing cross section rod of simple, durable and inexpensive construction.

More particularly it is my object to provide such a rod having on one face graduations arranged in the ordinary way, and having on the other face a graduated indicator capable of being moved to a variety of positions.

Still a further object is to provide such a device having a movable indicator provided with a clamp adapted to be locked in a variety of positions, and having an indicating member adapted to travel on the face having the fixed graduations.

A further object is to provide such a device so arranged that when the movable graduations have been fixed in a certain position and the device is used in connection with a surveying instrument, the figures on the face of the movable indicator will, whenever the rod is set up and the instrument is set, show the amount to be cut or filled, at the point where the rod is set up.

Still a further object is to provide such a rod which can be used in the ordinary way, or for giving elevations by direct reading, or as a self-computing cross section rod.

With these and other objects in view my invention consists in the construction, arrangement and combination of the various parts of the device, whereby the objects contemplated are attained, as hereinafter more fully set forth, pointed out in my claims, and illustrated in the accompanying drawings, in which:

Figure 1:
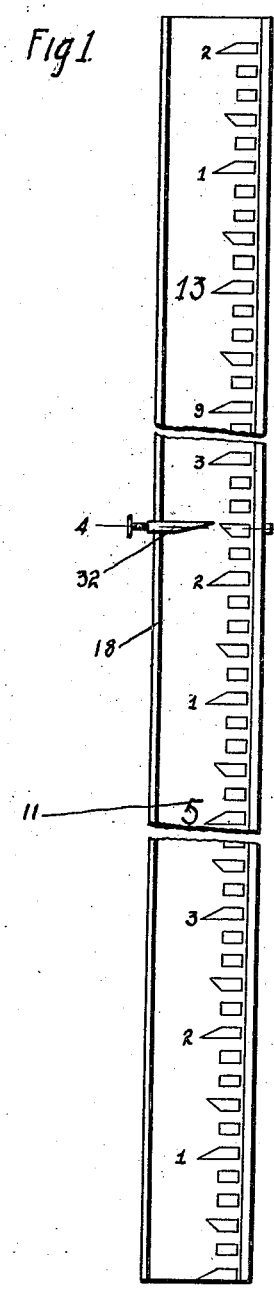
Figure 1 shows a front elevation of my improved device.

In the accompanying drawings, I have used the reference numeral 10 to indicate generally an upright rod having on its front face graduations or indicating characters 11.

This rod that has just been described can be used in the ordinary way in surveying.

On the rear face of the rod 10, I provide a movable indicator. The rear face of the rod is provided with vertically spaced recesses 12, in which are mounted casings.

The lower casing has side walls 13, a bottom wall 14, a top wall 15, and what may be called a front wall 16. The casings open rearwardly and the top wall 15 is of less length from front to rear than the bottom wall 14.

The rear face of the rod 10 is provided with a continuous groove or recess 17 between the recesses 12. The rod 10 is provided with metal strips 18 on the inside for strengthening and reinforcing it.

The lower casing is held in position by a metal strip 19, secured to the rear face of the rod 10 and extending downwardly and overlapping the edge of the upper wall 15.

The lower wall 14 is held in place by means of a metal strip 20 which is designed to slide in a groove 21 in the rear face of the rod 10. The strip 20 is provided with an elongated slot 22, and is adjustably locked in position by means of a thumb-screw 23.

Figure 2:
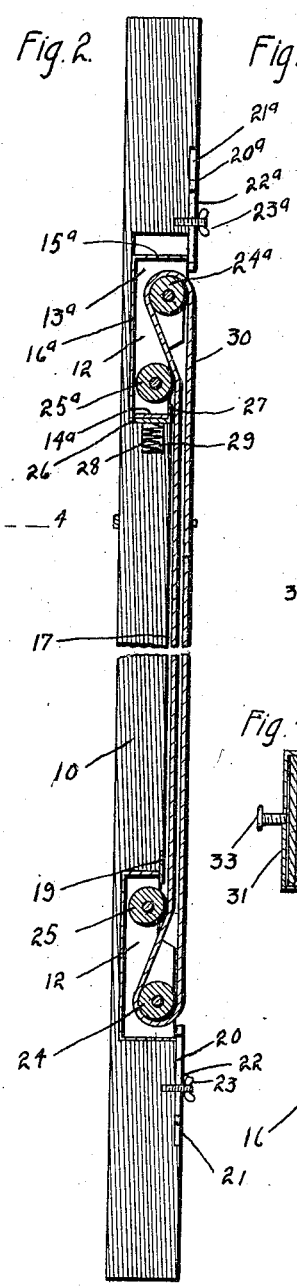
Fig. 2 shows a central, vertical, cross section view through the device shown in Fig. 1.
Figure 3:
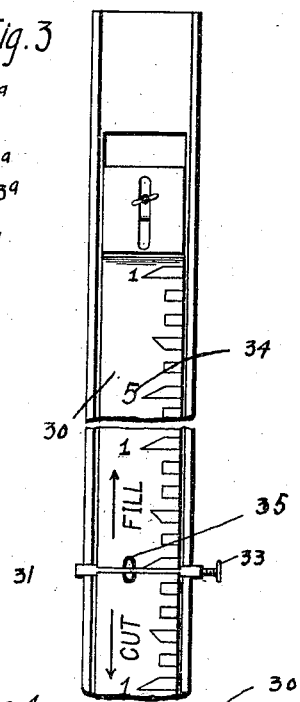
Fig. 3 shows a rear elevation of the device, parts being broken away.
Figure 4:
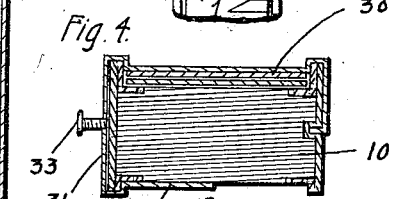
Fig. 4 shows a horizontal, sectional view taken on the line 4—4 of Fig. 1.
Figure 5:
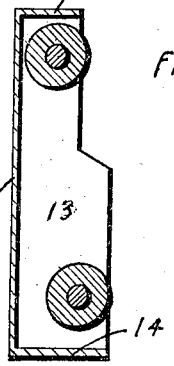
Fig. 5 shows an enlarged, vertical, sectional view through one of the casings for the roller on which the movable indicator travels.

Mounted in the lower portion of the lower casing for rotation is a roller 24. Mounted in the upper portion of the lower casing is another roller 25, which is set somewhat forwardly with relation to the roller 24, as illustrated in Fig. 2.

It will be seen that by loosening the screw 23 and lowering the strip 20, the lower end of the lower casing may be swung outwardly for removing the lower casing from the rod. The upper casing is similar to the lower casing in its general structure.

The upper recess 12 is longer than the upper casing to permit vertical adjustment of the upper casing within the upper recess 12. The upper casing has side walls 13ᵃ, a top wall 15ᵃ, a lower wall 14ᵃ and a forward wall 16ᵃ. The lower wall is shorter from front to rear than the upper wall.

Below the lower wall 14ᵃ is a plate 26 having at its rear edge an upwardly extending flange adapted to overlap the lower wall 14ᵃ. The plate 26 is secured to a spring 28 which is received within a slot 29 in the body of the rod 10, so that there is a constant yielding upper pressure on the upper casing, which is for the purpose of maintaining the movable indicator taut.

Mounted in the groove 21ª in the rear face of the rod 10 above the upper recess 12 is a plate 20ª having a vertically, elongated slot 22ª in which is received a thumb-screw 23ª.

The lower end of the plate 20ª is designed to engage the upper wall 15ª of the upper casing for holding the upper casing in the recess 12.

Mounted in the upper portion of the upper casing is a roller 24ª, and in the lower part of said casing is a lower roller 25ª located somewhat forwardly with relation to the roller 24ª.

Mounted on the rollers 24 and 24ª is an endless indicator 30. The rollers 25 and 25ª serve as guides, as illustrated in Fig. 2.

Slidably mounted on the rod 10 is a clamp device having an indicating finger 32 which travels up and down the front face of the rod. Mounted on the clamp 31 is a screw 33 by which the clamp may be locked in any position of its movement. The clamp 31 is secured to the movable indicator 30. The indicator 30 has on its face indicating characters 34.

In the practical use of my improved rod, the parts are installed in the manner hereinbefore described.

Assume that a grade has been determined, and that it is desired to set stakes along the road, or for any desired distance. The surveying instrument is set at some certain height, as for instance, 5.24; the indicating characters 34 on the face of the movable indicator are arranged in order from a certain fixed point, such as a cipher or naught 35. Some of the indicating characters run down from the cipher and some run up from the cipher. The clamp 31 is set with the indicating finger 32 opposite the 5.24 position on the front of the rod, and the rod is then used in making a survey. If the rod is set in a low place then when the cross hair on the instrument registers with a certain position on the back face of the rod, such position will be above the cipher and the movable indicator will indicate that at that point the ground is below grade and the rod will indicate the exact amount of fill to be made. If the rod is set on a high place, the instrument will indicate a point on the rear face of the rod below the cipher and the rod will indicate a certain cut is to be made at that point in the ground.

It should be understood that the zero is set at such a place on the face of the rod which would be the reading necessary if the rod were set on grade.

In case it is desired to read elevations directly the rod is held on the bench mark or starting point, the elevation of which is known or assumed, and that part of the movable indicator reading from naught down is so adjusted that the elevation of the bench mark or starting point appears on the cross hair of the instrument. It is only necessary to prefix 10, 100, 1000, etc., as the case may be to the reading on the rod. For instance, the elevation of the bench mark is 103,57, 3.57 is read on the rod and 10 is prefixed. The rear part of the rod can be used by reading down for securing ordinary elevations. In order to secure ordinary elevations the movable rod is set so that the elevation of the bench marks or starting point appears on the cross hair of the instrument. When this has been done elevations of the points may be read directly and without computation. Thus it appears that the rod can be used in the ordinary way, or can be used by giving elevations by direct reading on the movable face of the rod, and can be used as a self-computing rod in cross sectioning.

When desired the movable indicator and casings may be removed and the front face of the rod used in the ordinary way.

Some changes may be made in the construction and arrangement of parts of my improved rod without departing for the essential features and purposes of my invention, and it is my intention to cover by my claims any modified forms of structure or use of mechanical equivalents as may be included within the scope of my claims.

It will be obvious that there is constant spring tension for maintaining the movable indicator taut, and that various means could be employed for mounting the graduated indicator movably on the rear face of the rod.

I claim as my invention.

1. In a device of the class described, a surveyor's rod having on one face indicating characters, said rod having on another face a movable scale provided with graduations, means for fixing said movable scale in different positions of its adjustment, and an adjustable indicator member adapted to be mounted at different heights on said rod.

2. In a device of the class described, a surveyor's rod having graduations on one face thereof, and having spaced recesses, a casing received in one of said recesses, having a roller therein, a casing slidably received in the other of said recesses, having a roller therein, and an endless flexible scale on said rollers.

3. In a device of the class described, a surveyor's rod having graduations on one face thereof, and having spaced recesses, a casing received in one of said recesses, having a roller therein, a casing slidably received in the other of said recesses, having a roller therein, an endless flexible scale on said rollers, and means for yieldingly moving said slidable casing toward one position of its movement.

4. In a device of the class described, a surveyor's rod having graduations on one face thereof, and having spaced recesses, a casing received in one of said recesses, having a roller therein, a casing slidably received in the other of said recesses, having a roller therein, and an endless flexible scale on said rollers, said casings having also guide rollers.

Des Moines, Iowa, September 17, 1917.

ERNEST B. HIATT.

Copies of this patent may be obtained for five cents each, by addressing the "Commissioner of Patents, Washington, D. C."